United States Patent
Salehifar et al.

(10) Patent No.: US 11,303,929 B2
(45) Date of Patent: Apr. 12, 2022

(54) IMAGE CODING METHOD USING LOOKUP TABLE FOR INTRA PREDICTION MODE AND APPARATUS THEREFOR

(71) Applicant: LG Electronics Inc., Seoul (KR)

(72) Inventors: Mehdi Salehifar, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/044,590

(22) PCT Filed: Mar. 22, 2019

(86) PCT No.: PCT/KR2019/003380
§ 371 (c)(1),
(2) Date: Oct. 1, 2020

(87) PCT Pub. No.: WO2019/194440
PCT Pub. Date: Oct. 10, 2019

(65) Prior Publication Data
US 2021/0203984 A1   Jul. 1, 2021

Related U.S. Application Data

(60) Provisional application No. 62/651,680, filed on Apr. 2, 2018.

(51) Int. Cl.
*H04N 19/593*   (2014.01)
*H04N 19/11*    (2014.01)
(Continued)

(52) U.S. Cl.
CPC ........... *H04N 19/593* (2014.11); *H04N 19/11* (2014.11); *H04N 19/132* (2014.11); *H04N 19/174* (2014.11); *H04N 19/176* (2014.11)

(58) Field of Classification Search
None
See application file for complete search history.

(56) References Cited

U.S. PATENT DOCUMENTS

2009/0296813 A1   12/2009   Garg et al.
2013/0089144 A1*   4/2013   Lee .................. H04N 19/13
                                                    375/240.12
(Continued)

FOREIGN PATENT DOCUMENTS

JP         2010135864      6/2010
KR       1020130049522     5/2013
(Continued)

*Primary Examiner* — Chikaodilie Anyikire
(74) *Attorney, Agent, or Firm* — Fish & Richardson P.C.

(57) ABSTRACT

A method for decoding an image by a decoding apparatus according to the present disclosure comprises the steps of: acquiring intra prediction mode information of a current block; rearranging the remaining intra prediction modes on the basis of a lookup table; deriving a subgroup of the current block on the basis of subgroup information; decoding remaining intra prediction mode information on the basis of a binarization method for the subgroup; deriving, as an intra prediction mode of the current block, an intra prediction mode indicated by the decoded remaining intra prediction mode information among the intra prediction modes included in the subgroup; and generating a prediction sample of the current block on the basis of the intra prediction mode.

11 Claims, 12 Drawing Sheets

(51) Int. Cl.
*H04N 19/132* (2014.01)
*H04N 19/174* (2014.01)
*H04N 19/176* (2014.01)

(56) References Cited

U.S. PATENT DOCUMENTS

2014/0376626 A1* 12/2014 Lee ...................... H04N 19/196
 375/240.12
2017/0347103 A1* 11/2017 Yu ....................... H04N 19/1883
2019/0166370 A1* 5/2019 Xiu ...................... H04N 19/147
2019/0222837 A1* 7/2019 Lee ........................ H04N 19/44

FOREIGN PATENT DOCUMENTS

KR 101505755 3/2015
WO WO2012/161445 11/2012

* cited by examiner

IMAGE CODING METHOD USING LOOKUP TABLE FOR INTRA PREDICTION MODE AND APPARATUS THEREFOR

CROSS-REFERENCE TO RELATED APPLICATIONS

This application is a National Stage application under 35 U.S.C. § 371 of International Application No. PCT/KR2019/003380, filed on Mar. 22, 2019, which claims the benefit of U.S. Provisional Application No. 62/651,680 filed on Apr. 2, 2018. The disclosures of the prior applications are incorporated by reference in their entirety.

BACKGROUND OF THE DISCLOSURE

Field of the Disclosure

The present disclosure relates generally to an image coding technology and, more particularly, to an image decoding method and apparatus using a look-up table for an intra prediction mode in an image coding system.

Related Art

Nowadays, demand for high-resolution, high-quality images such as high definition (HD) images and ultra high definition (UHD) images is increasing in various fields. As image data become high resolution and high quality, the amount of information or bits to be transmitted increases relative to the conventional image data. Therefore, when such image data are transmitted using a medium such as a conventional wired/wireless broadband line, or stored using a conventional storage medium, the transmission cost and the storage cost thereof are increased.

Accordingly, there is a need for a highly efficient image compression technique for effectively transmitting, storing, and reproducing information of high resolution, high-quality images.

SUMMARY

A technical objective of the present disclosure is to provide a method and apparatus which increase image coding efficiency.

Another technical objective of the present disclosure is to provide an image decoding method and apparatus which decode intra prediction mode information for a current block based on a lookup table.

Another technical objective of the present disclosure is to provide an image decoding method and apparatus which rearrange remaining intra prediction modes based on a lookup table, classify them into a plurality of subgroups, and decode remaining intra prediction mode information for a current block.

Another technical objective of the present disclosure is to provide an image decoding method and apparatus which derive a subgroup for a current block based on a lookup table, and decode remaining intra prediction mode information for the current block based on a binarization method of the subgroup.

According to an example of the present disclosure, there is provided an image decoding method which is performed by a decoding apparatus. The method includes obtaining intra prediction mode information on a current block, wherein the intra prediction mode information includes subgroup information and remaining intra prediction mode information, rearranging remaining intra prediction modes based on a lookup table, deriving a plurality of subgroups for the rearranged remaining intra prediction modes, deriving a subgroup for the current block based on the subgroup information, decoding the remaining intra prediction mode information based on a binarization method for the subgroup, deriving an intra prediction mode indicated by the decoded remaining intra prediction mode information among intra prediction modes included in the subgroup as an intra prediction mode for the current block, and generating a prediction sample for the current block based on the intra prediction mode.

According to another example of the present disclosure, there is provided a decoding apparatus which performs image decoding. The decoding apparatus includes an entropy decoder obtaining intra prediction mode information on a current block, wherein the intra prediction mode information includes subgroup information and remaining intra prediction mode information, an entropy encoder rearranging remaining intra prediction modes based on a lookup table, deriving a plurality of subgroups for the rearranged remaining intra prediction modes, deriving a subgroup for the current block based on the subgroup information, and decoding the remaining intra prediction mode information based on a binarization method for the subgroup, and a predictor deriving an intra prediction mode indicated by the decoded remaining intra prediction mode information among intra prediction modes included in the subgroup as an intra prediction mode for the current block, and generating a prediction sample for the current block based on the intra prediction mode.

According to still another example of the present disclosure, there is provided a video encoding method which is performed by an encoding apparatus. The method includes determining an intra prediction mode for a current block, generating a prediction sample for the current block based on the intra prediction mode, rearranging remaining intra prediction modes based on a lookup table, deriving a plurality of subgroups for the rearranged remaining intra prediction modes, and encoding remaining intra prediction mode information based on a binarization method for a subgroup including the intra prediction mode for the current block.

According to still another example of the present disclosure, there is provided a video encoding apparatus. The encoding apparatus includes a predictor determining an intra prediction mode for a current block, and generating a prediction sample for the current block based on the intra prediction mode, and an entropy encoder rearranging remaining intra prediction modes based on a lookup table, deriving a plurality of subgroups for the rearranged remaining intra prediction modes, and encoding remaining intra prediction mode information based on a binarization method for a subgroup including the intra prediction mode for the current block.

According to the present disclosure, the intra prediction modes may be rearranged in the order of high probability of occurrence based on the lookup table, and an amount of bits for indicating an intra prediction mode of the current block may be reduced by coding intra prediction mode information indicating a rearranged index value, so that overall coding efficiency may be improved.

According to the present disclosure, the remaining intra prediction modes excluding MPM candidates are rearranged, the intra prediction mode information may be coded by classifying the rearranged intra prediction modes into a plurality of subgroups and changing the binarization method according to the subgroup including the intra prediction mode of the current block, and through this, the amount of bits for indicating the intra prediction mode of the current block can be reduced and the overall coding efficiency can be improved.

DESCRIPTION OF EXEMPLARY EMBODIMENTS

Figure 1:
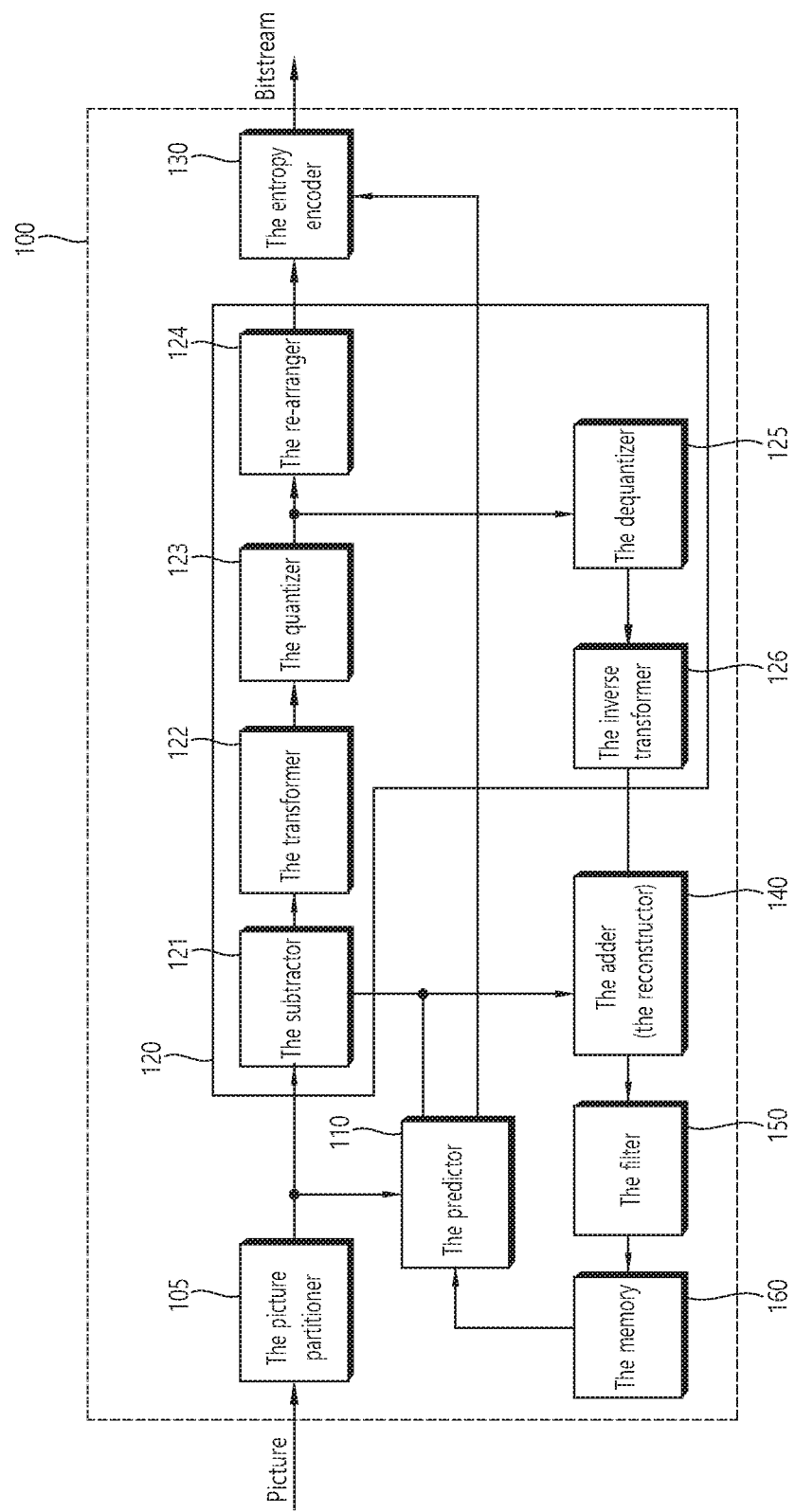
FIG. 1 is a schematic diagram illustrating a configuration of a video encoding apparatus to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

Meanwhile, the present disclosure relates to video/image coding. For example, the method(s)/embodiment(s) disclosed in the present disclosure may be applied to a method disclosed in a versatile video coding (VVC) standard or a next generation video/image coding standard.

In the present specification, generally a picture means a unit representing an image at a specific time, a slice/tile is a unit constituting a part of the picture. a slice/tile may include one or more coding tree units (CTU). One picture may be composed of plural slices/tiles, and one tile group may include one or more tiles.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 is a schematic diagram illustrating a configuration of a video encoding device to which the present disclosure is applicable.

Referring to FIG. 1, a video encoding device 100 may include a picture partitioner 105, a predictor 110, a residual processor 120, an entropy encoder 130, an adder 140, a filter 150, and a memory 160. The residual processor 120 may include a subtractor 121, a transformer 122, a quantizer 123, a re-arranger 124, a dequantizer 125, an inverse transformer 126.

The picture partitioner 105 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure and/or a binary tree structure. In this case, for example, the quad tree structure may be first applied and the binary tree structure may be applied later. Alternatively, the binary tree structure may be applied first. The coding procedure according to the present disclosure may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor 110 may perform prediction on a processing target block (hereinafter, a current block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and can be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transformation based on the size of a corresponding transform block and a prediction mode applied to a coding block or prediction block spatially overlapping with the transform block. For example, residual samples can be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy encoder 130 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 130 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
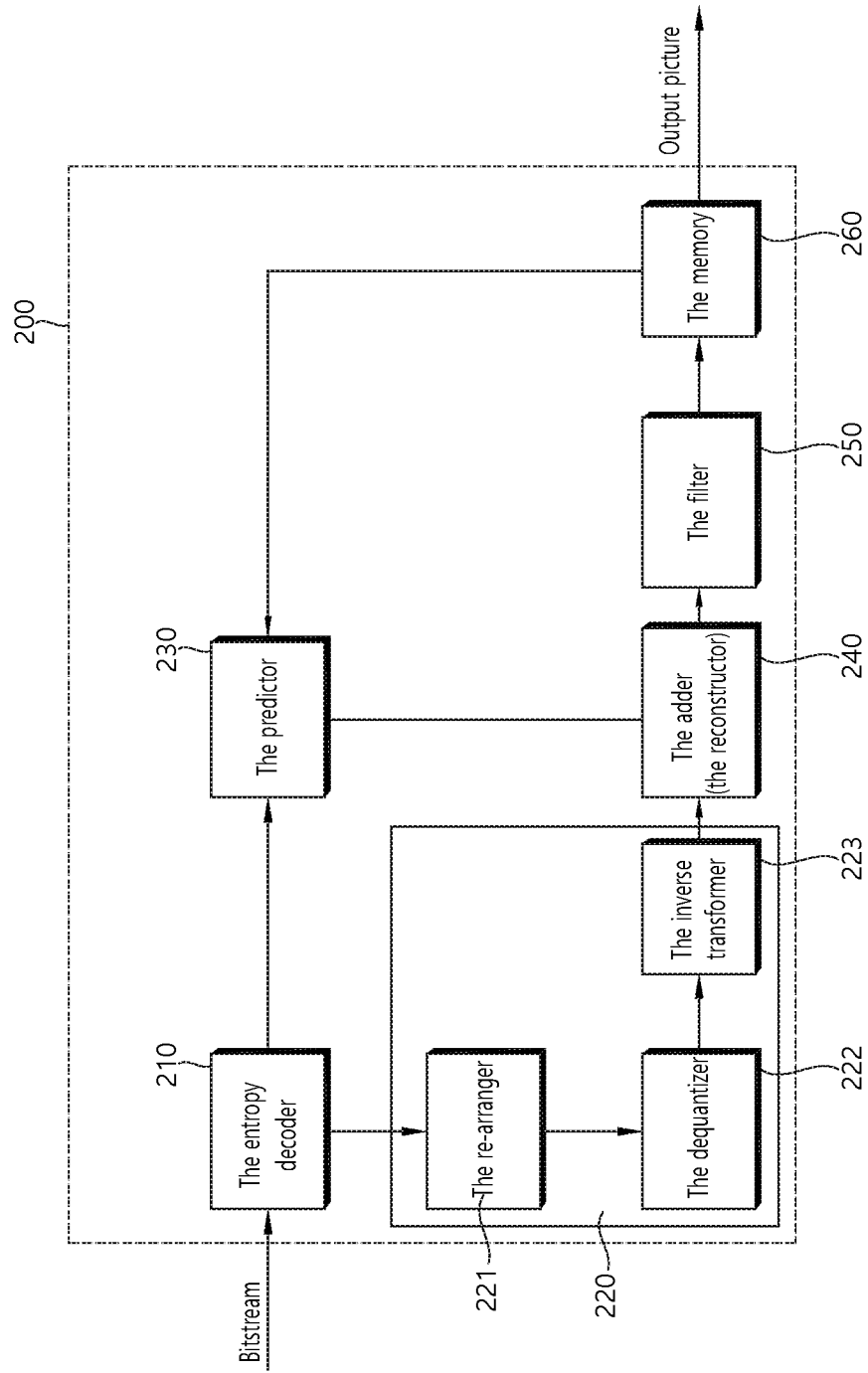
FIG. 2 is a schematic diagram illustrating a configuration of a video decoding apparatus to which the present disclosure is applicable.

FIG. 2 is a schematic diagram illustrating a configuration of a video decoding device to which the present disclosure is applicable.

Referring to FIG. 2, a video decoding device 200 may include an entropy decoder 210, a residual processor 220, a predictor 230, an adder 240, a filter 250, and a memory 260. The residual processor 220 may include a re-arranger 221, a dequantizer 222, an inverse transformer 223.

When a bitstream including video information is input, the video decoding device 200 may reconstruct a video in relation to a process by which video information is processed in the video encoding device.

For example, the video decoding device 200 may perform video decoding using a processing unit applied in the video encoding device. Thus, the processing unit block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder 210 may parse the bitstream to output information required for video reconstruction or picture reconstruction. For example, the entropy decoder 210 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information on prediction among information decoded in the entropy decoder 210 may be provided to the predictor 230 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding device. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding device.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 230 may derive a prediction sample for a current block based on a sample specified in a reference picture according to a motion vector. The predictor 230 may derive the prediction sample for the current block using one of the skip mode, the merge mode and the MVP mode. Here, motion information required for inter-prediction of the current block provided by the video encoding device, for example, a motion vector and information on a reference picture index may be obtained or derived based on the information on prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information on prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information on prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor 230 may obtain a motion vector included in the information on prediction and derive the motion vector of the current block by adding the motion vector difference to the motion vector predictor. In addition, the predictor may obtain or derive a reference picture index indicating a reference picture from the aforementioned information on prediction.

The adder 240 can add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a reconstructed sample. Although the adder 240 is described as a separate component, the adder 240 may be a part of the predictor 230. Meanwhile, the adder 240 may be referred to as a reconstructor or reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture (decoded picture) or information necessary for decoding. Here, the reconstructed picture may be the reconstructed picture filtered by the filter 250. For example, the memory 260 may store pictures used for inter-prediction. Here, the pictures used for inter-prediction may be designated according to a reference picture set or a reference picture list. A reconstructed picture may be used as a reference picture for other pictures. The memory 260 may output reconstructed pictures in an output order.

Meanwhile, when the intra prediction is applied to the current block, as described above, the encoding apparatus/decoding apparatus may derive an intra prediction mode for the current block, and may derive a prediction sample of the current block based on the intra prediction mode. That is, the encoding apparatus/decoding apparatus may derive the prediction sample of the current block by applying a directional mode or a non-directional mode based on the neighboring reference samples of the current block.

For reference, in an example, the intra prediction mode may include two non-directional (or non-angular) intra prediction modes and 65 directional (or angular) intra prediction modes. The non-directional intra prediction modes may include a No. 0 planar intra prediction mode, and a No. 1 DC intra prediction mode, and the directional intra prediction modes may include 65 intra prediction modes between a No. 2 intra prediction mode and a No. 66 intra prediction mode. However, this is an example, and the present disclosure may be applied to a case where there are different number of intra prediction modes. Meanwhile, according to circumstances, a No. 67 intra prediction mode may be further used, and the No. 67 intra prediction mode may represent a linear model (LM) mode.

Figure 3:
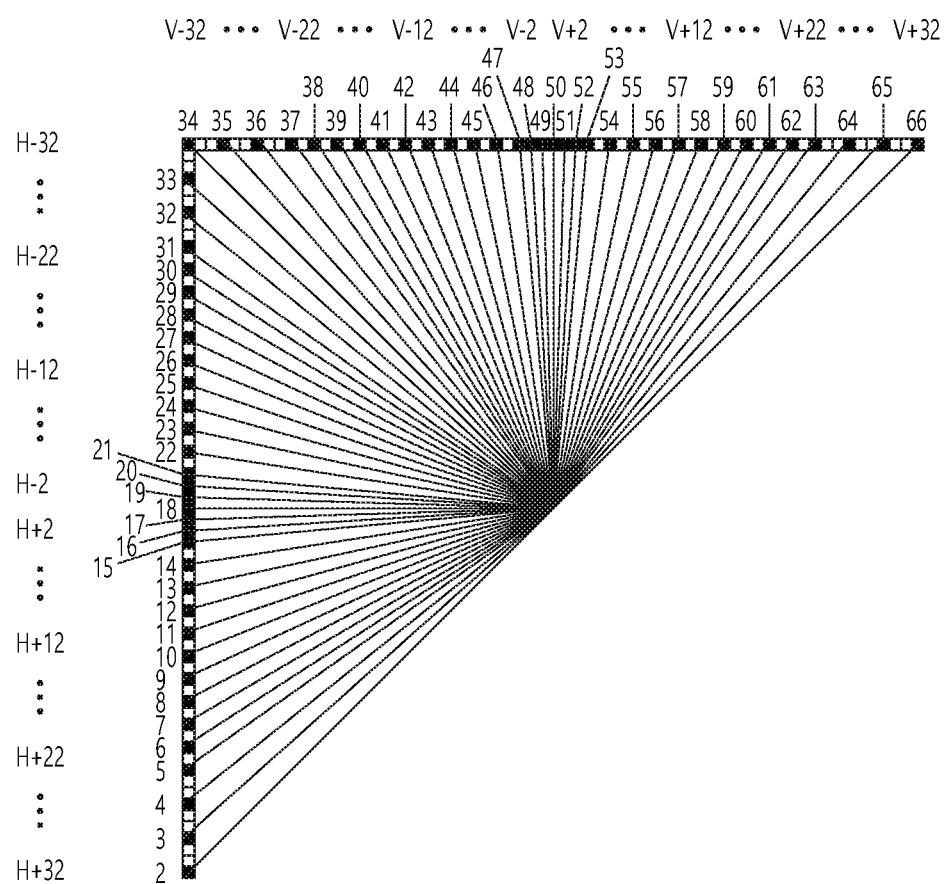
FIG. 3 illustratively represents intra directional modes of 65 prediction directions.

FIG. 3 illustratively represents intra directional modes of 65 prediction directions.

Referring to FIG. 3, it is possible to distinguish an intra prediction mode having a horizontal directionality from an intra prediction mode having a vertical directionality around a No. 34 intra prediction mode having a left upward diagonal prediction direction. H and V of FIG. 3 mean horizontal directionality and vertical directionality, respectively, and numerals −32 to 32 indicate displacements in 1/32 units on the sample grid position. For example, the Nos. 2 to 34 intra prediction modes have horizontal directionality, and the Nos. 35 to 66 intra prediction modes have vertical directionality. The No. 18 intra prediction mode and the No. 50 intra prediction mode may represent a horizontal intra prediction mode and a vertical intra prediction mode, respectively, the No. 2 intra prediction mode may be called a left downward diagonal intra prediction mode, the No. 34 intra prediction mode may be called a left upward diagonal intra prediction mode, and the No. 66 intra prediction mode may be called a right upward diagonal intra prediction mode.

Meanwhile, when the intra prediction is applied to the current block, an intra prediction mode applied to the current block may be derived based on an intra prediction mode of a neighboring block of the current block. For example, the decoding apparatus may derive a most probable mode (MPM) list based on an intra prediction mode of a neighboring block (e.g., a left neighboring block and/or a top neighboring block) of the current block and additional candidate modes, and may select one of the MPM candidates in the derived MPM list based on the received MPM index, or may select one of the remaining intra prediction modes not included in the MPM candidates based on remaining intra prediction mode information. The MPM list may be referred to as an intra prediction mode candidate list or may be denoted as candModeList.

Here, for example, the MPM list may include 3 MPM candidates, 5 candidates, or 6 MPM candidates. As one example, the MPM list may include candidates derived based on an intra prediction mode of a neighboring block, a derived intra prediction mode, and/or a default intra prediction mode. The encoding apparatus/decoding apparatus may search neighboring blocks of the current block in a specific order, and may derive the intra prediction mode of the neighboring block as the MPM candidate in the derived order. For example, the neighboring blocks may include a left neighboring block, a top neighboring block, a bottom-left neighboring block, a top-right neighboring block, and a top-left neighboring blocks, and the encoding/decoding apparatus may search for an intra prediction mode of the left neighboring block, an intra prediction mode, planar intra prediction mode, DC intra prediction mode of the top neighboring block, an intra prediction mode of the bottom-left neighboring block, an intra prediction mode of the top-right neighboring block, and an intra prediction mode of the top-left neighboring block in this order, may derive an MPM candidate, and may construct an MPM list of the current block. Meanwhile, if six MPM candidates are not derived after the search, an MPM candidate may be derived based on an intra prediction mode derived as an MPM candidate. For example, when the intra prediction mode derived as the MPM candidate is a No. N intra prediction mode, the encoding apparatus/decoding apparatus may derive the No. N+1 intra prediction mode and/or No. N−1 intra prediction mode as the MPM candidate of the current block. Meanwhile, the neighboring blocks may be as described later.

Figure 4:
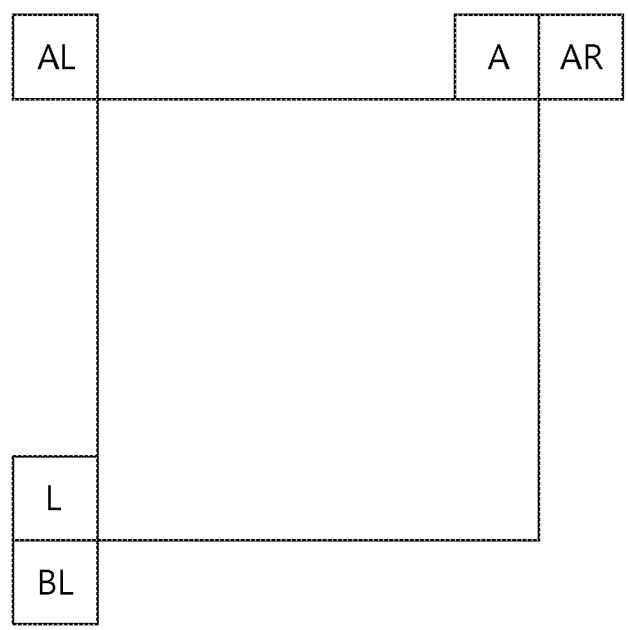
FIG. 4 illustratively represents neighboring blocks of the current block.

FIG. 4 illustratively represents neighboring blocks of the current block. Referring to FIG. 4, if a size of the current block is W×H, and an x component of the top-left sample position of the current block is 0 and a y component thereof is 0, then the left neighboring block may be a block including a sample of coordinates (−1, H−1), the top neighboring block may be a block including a sample of coordinates (W−1, −1), the top-right neighboring block may be a block including a sample of coordinates (W, −1), the bottom-left neighboring block may be a block including a sample of coordinates (−1, H), and the top-left neighboring block may be a block including a sample of coordinates (−1, −1).

Meanwhile, for example, whether the intra prediction mode applied to the current block is included in the MPM candidates or in the remaining intra prediction modes may be derived based on an MPM flag. Specifically, when the value of the MPM flag is 1, the MPM flag may indicate that the intra prediction mode of the current block is included in MPM candidates (MPM list), whereas when the value of the MPM flag is 0, the MPM flag may indicate that the intra prediction mode for the current block is not included in MPM candidates (MPM list) but is included in the remaining intra prediction modes. Meanwhile, the MPM index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. Further, the MPM flag may be signaled in the form of an intra_luma_mpm_flag syntax element, and when the MPM flag is not signaled, the value of the MPM flag may be considered as 1. Further, for example, the remaining intra prediction mode information may index the remaining intra prediction modes not included in the MPM candidates among all intra prediction modes in the order of the prediction mode number, and may indicate one of the remaining intra prediction modes. The intra prediction mode may be an intra prediction mode for a luma component (sample). Hereinafter, the intra prediction mode information may include at least one of the MPM flag, the MPM index, and the remaining intra prediction mode information. In addition, the MPM list may be referred to as various terms such as an MPM candidate list and candModeList. Meanwhile, the encoding apparatus may derive the MPM list for the current block based on the intra prediction mode and additional candidate modes of the neighboring block of the current block, determine the intra prediction mode of the current block, encode intra prediction mode information for the current block, and store and/or transmit the encoded intra prediction mode information.

As described above, one of the MPM candidates included in the MPM list for the current block may be derived as an intra prediction mode for the current block, but one of the remaining intra prediction modes not included in the MPM candidates may be derived as an intra prediction mode for the current block. For example, the above-described remaining intra prediction mode information may index the remaining intra prediction modes not included in the MPM candidates among all intra prediction modes in the order of prediction mode number, and may indicate one of the remaining intra prediction modes, which may be derived as an intra prediction mode for the current block.

However, a method of coding so that intra prediction modes are indexed In the order of their probability to be applied to an image may improve the coding efficiency more than the method of coding so that the remaining intra prediction mode information indexes the remaining intra prediction modes not included in the MPM candidates among all intra prediction modes in the order of the prediction mode number. Accordingly, the present disclosure proposes a method of rearranging the remaining intra prediction modes based on a lookup table, and coding so that the remaining intra prediction mode information is indexed in the order of the rearrangement. The lookup table may be expressed as a probability mode table or mode priority list, and may indicate the priority of intra prediction modes. Specific embodiments will be described as below.

Figure 5:
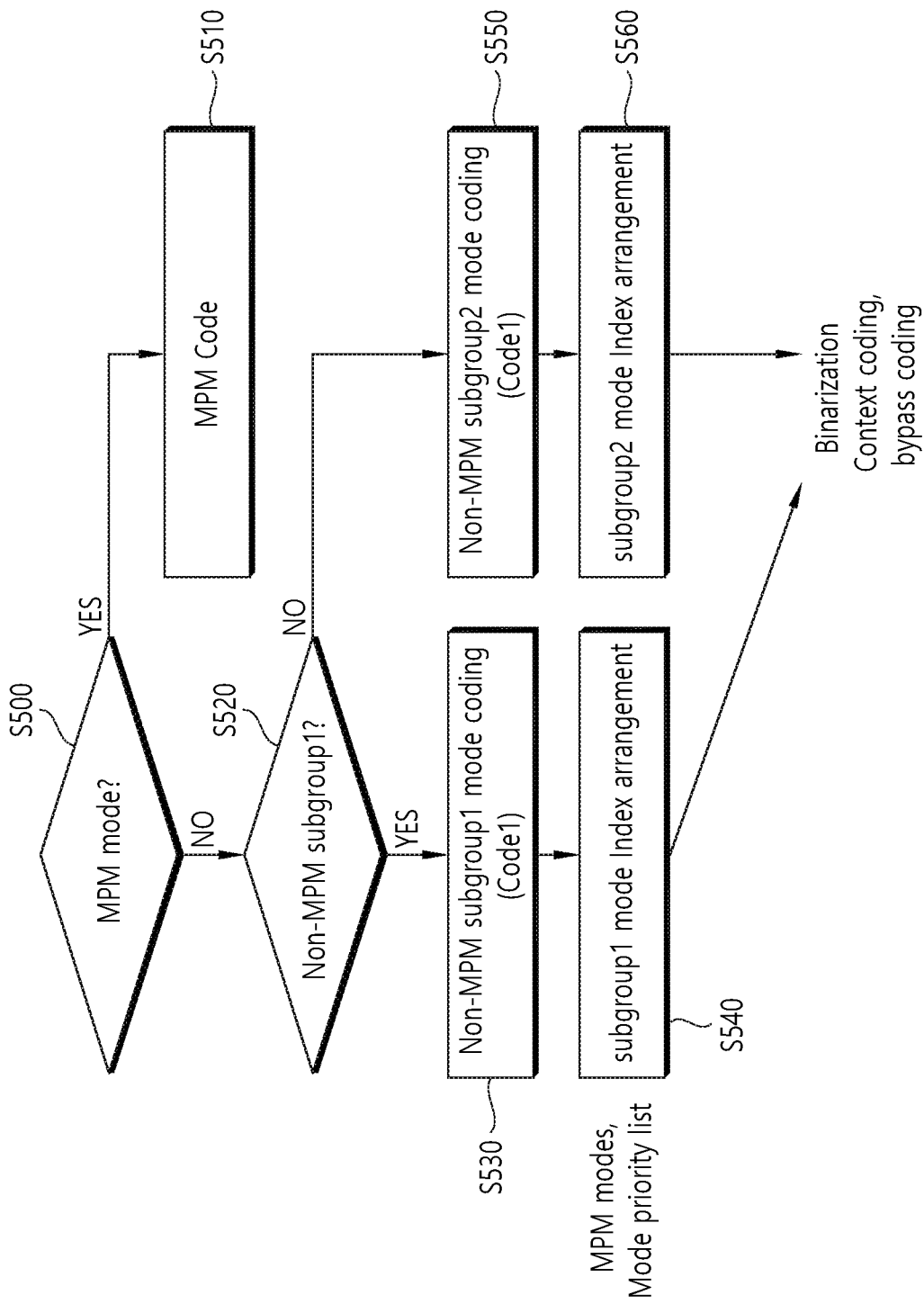
FIG. 5 shows an example of coding information on the remaining intra prediction modes based on a lookup table.

FIG. 5 shows an example of coding information on the remaining intra prediction modes based on a lookup table. FIG. 5 may represent an example of classifying the remaining intra prediction modes into two subgroups and coding them.

The encoding apparatus may determine an intra prediction mode for the current block and determine whether or not the intra prediction mode is included in MPM candidates for the current block (S500). The encoding apparatus may construct the MPM list including MPM candidates for the current block. In addition, the encoding apparatus may perform various intra prediction modes to derive an intra prediction mode with an optimal RD cost as the intra prediction mode for the current block. The intra prediction mode may be one of two non-directional intra prediction modes and 65 intra directional prediction modes. As described above, the two non-directional intra prediction modes may include the intra DC mode and the intra planar mode.

In this case, the intra prediction mode for the current block may be one of the MPM candidates, or may be one of the remaining intra prediction modes excluding the MPM candidates.

When the intra prediction mode for the current block is one of the MPM candidates, the encoding apparatus may code intra prediction mode information including an MPM index which indicates the intra prediction mode for the current block among the MPM candidates (S510).

On the other hand, when the intra prediction mode for the current block is not included in the MPM candidates, that is, when the intra prediction mode for the current block is one of the remaining intra prediction modes, the encoding apparatus may determine whether or not the intra prediction mode is included in subgroup 1 (S520). The subgroup 1 may also be referred to as non-MPM subgroup 1. For example, the remaining intra prediction modes may be classified into two subgroups. Specifically, among the intra prediction modes, the remaining intra prediction modes excluding the MPM candidates may be rearranged in the order of priority indicated in the lookup table, and $K_1$ intra prediction modes in the rearranged order may be set as a first subgroup, while $K_2$ intra prediction modes following the $K_1$ intra prediction modes in the rearranged order may be set as a second subgroup. That is, for example, the first intra prediction mode to the $K_1^{th}$ intra prediction mode in the rearranged order may be set as the first subgroup, and the $(K_1+1)^{th}$ intra prediction mode to the $(K_2+K_1)^{th}$ intra prediction mode in the rearranged order may be set as the second subgroup. The encoding apparatus may determine whether the intra prediction mode for the current block is included in subgroup 1.

Meanwhile, the lookup table may be predetermined, and represent ranks of intra prediction modes. That is, the lookup table may show the ranks of all the intra prediction modes. Here, the rank of the intra prediction mode may indicate the degree of occurrence of the intra prediction mode. Therefore, the intra prediction mode, which is frequently used for prediction in an image, may be appeared as a high rank in the lookup table, and the intra prediction mode, which is not frequently used for prediction in an image, may be appeared as a low rank in the lookup table.

For example, the lookup table may be set as shown in the following table.

TABLE 1

| Rank | Mode |
|---|---|
| 0 | 66 |
| 1 | 2 |
| 2 | 18 |
| 3 | 33 |
| ... | ... |
| ... | ... |
| 67 | 1 |

Here, Rank may indicate a ranking, and Mode may indicate an intra prediction mode for the ranking. Referring to Table 1, the rank of the No. 66 intra prediction mode may be derived as 0, the rank of the No. 2 intra prediction mode may be derived as 1, the rank of the No. 18 intra prediction mode may be derived as 2, the rank of the No. 33 intra prediction mode may be derived as 3, and the rank of the No. 1 intra prediction may be derived as 67.

Furthermore, the number of intra prediction modes included in each of the subgroups may be predetermined. That is, the $K_1$ and $K_2$ may be predetermined. For example, the number of remaining intra prediction modes may be 61 (i.e., when 6 MPM candidates are derived from 67 intra prediction modes), the $K_1$ may be predetermined to 29, and the $K_2$ may be predetermined to 32.

Figure 6:
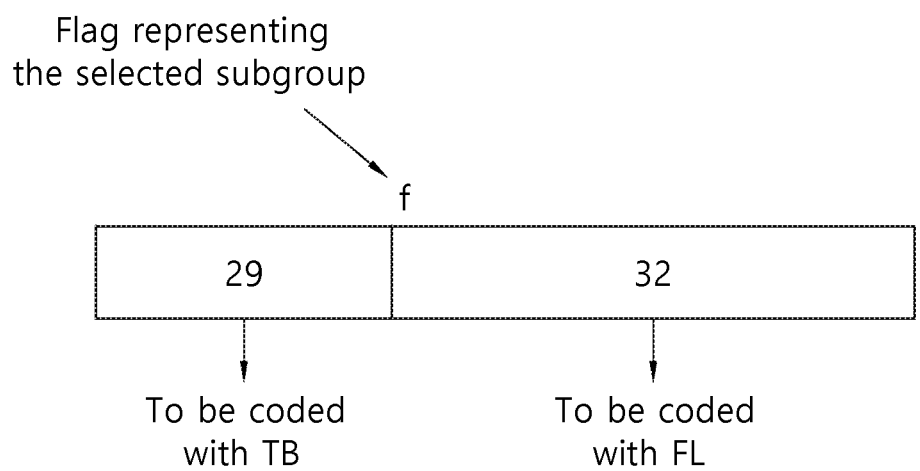
FIG. 6 shows an example of dividing the 61 remaining intra prediction modes into two subgroups.

FIG. 6 shows an example of dividing the 61 remaining intra prediction modes into two subgroups. Referring to FIG. 6, the subgroup 1 may include 29 intra prediction modes in the rearranged order, and the subgroup 2 may include 32 intra prediction modes following the 29 intra prediction modes in the rearranged order. That is, the subgroup 1 may include the first intra prediction mode to the $29^{th}$ intra prediction mode in the rearranged order, and the subgroup 2 may include the $30^{th}$ intra prediction mode to the $61^{st}$ intra prediction mode in the rearranged order. Meanwhile, the encoding apparatus may generate subgroup information indicating the subgroup for the current block. When the number of subgroups is 2, the subgroup information may be a flag having a value of 0 or 1, and when the number of subgroups is N (N>2), the subgroup information may be an index having any one value of 0 to N.

Referring back to FIG. 5, when the intra prediction mode for the current block is included in the subgroup 1, the encoding apparatus may derive a binarization method for the subgroup 1 (S540), and the remaining intra prediction mode information indicating the intra prediction mode for the current block may be encoded based on the binarization method for the subgroup 1 (S550).

When the intra prediction mode for the current block is not included in the subgroup 1, the encoding apparatus may derive a binarization method for the subgroup 2 (S560), and the remaining intra prediction mode information indicating the intra prediction mode for the current block may be encoded based on the binarization method for the subgroup 2 (S570).

For example, since the number of intra prediction modes included in each of the subgroups may be predetermined, the binarization method for the corresponding subgroup may be set based on the number of intra prediction modes included in the corresponding subgroup. For example, truncated binary (TB) code, fixed length (FL) code, or truncated unary (TU) code may be set as the binarization method for the corresponding subgroup.

Referring to FIG. 6, the binarization method for the first subgroup may be set to the TB code, and the binarization method for the second subgroup may be set to the FL code. Accordingly, the remaining intra prediction mode information indicating the intra prediction mode included in the first subgroup may be coded based on the TB code, and the remaining intra prediction mode information indicating the intra prediction mode included in the second subgroup may be coded based on the FL code. For example, the encoding apparatus may binarize with the TB code a value of the remaining intra prediction mode information indicating the intra prediction mode included in the first subgroup, and may context-based encode or bypass encode the binarized value. The encoding apparatus may binarize with the FL code a value of the remaining intra prediction mode information indicating the intra prediction mode included in the second subgroup, and may context-based encode or bypass encode the binarized value.

On the other hand, as another example, a plurality of lookup tables may be predetermined, and a specific lookup table of the plurality of lookup tables may be used to indicate the remaining intra prediction mode information for the current block. For example, information indicating a lookup table to be used among the plurality of lookup tables may be signaled. Alternatively, a lookup table to be used for the current block may be derived based on intra prediction mode information of a neighboring block of the current block and the like. Further, an update of the above-described lookup table, that is, information indicating a lookup table to be used among the plurality of lookup tables may be signaled at a CU level, a CTU level, or a slice level.

Meanwhile, the decoding apparatus may rearrange the intra prediction modes based on the lookup table, and obtain the intra prediction mode information on the current block, and the intra prediction mode information may include subgroup information and remaining intra prediction mode information. Here, the subgroup information may be a flag indicating 0 or 1. For example, when the value of the flag is 0, the flag may indicate the subgroup 1 of two subgroups, while when the value of the flag is 1, the flag may indicate the subgroup 2 of two subgroups.

Thereafter, the decoding apparatus may derive the subgroup for the current block based on the subgroup information, and decode the remaining intra prediction mode information for the current block based on the coding method for the subgroup. Among the rearranged intra prediction modes, an intra prediction mode indicated by the decoded intra prediction mode information may be derived as an intra prediction mode for the current block.

Meanwhile, as another embodiment, a method of classifying and coding the remaining intra prediction modes into M (M>2) subgroups may be proposed.

Figure 7:
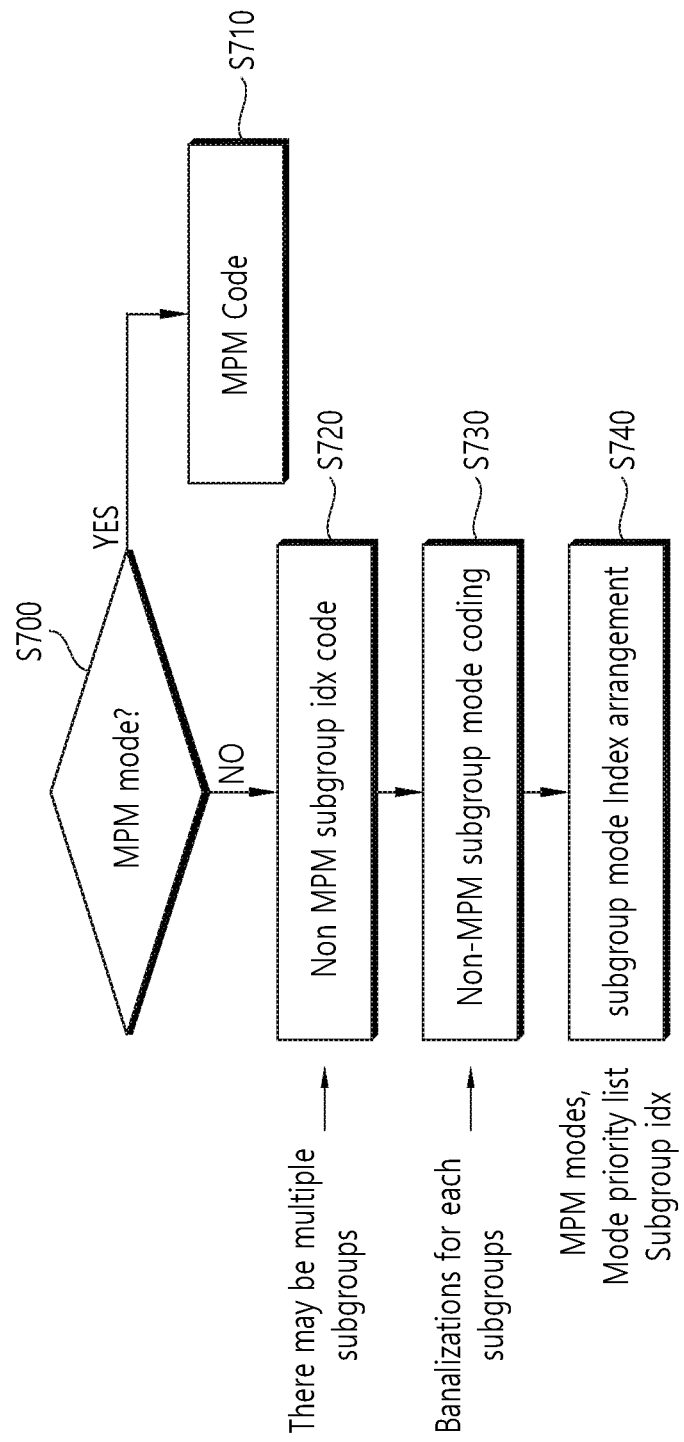
FIG. 7 shows an example of coding information on the remaining intra prediction modes based on a lookup table.

FIG. 7 shows an example of coding information on the remaining intra prediction modes based on a lookup table. FIG. 7 may represent an example of classifying the remaining intra prediction modes into M (M>2) subgroups and coding them.

The encoding apparatus may determine an intra prediction mode for the current block and determine whether or not the intra prediction mode is included in MPM candidates for the current block (S700). The encoding apparatus may construct the MPM list including MPM candidates for the current block. In addition, the encoding apparatus may perform various intra prediction modes to derive an intra prediction mode with an optimal RD cost as the intra prediction mode for the current block. The intra prediction mode may be one of two non-directional intra prediction modes and 65 intra directional prediction modes. As described above, the two non-directional intra prediction modes may include the intra DC mode and the intra planar mode.

In this case, the intra prediction mode for the current block may be one of the MPM candidates, or may be one of the remaining intra prediction modes excluding the MPM candidates.

When the intra prediction mode for the current block is one of the MPM candidates, the encoding apparatus may code intra prediction mode information including an MPM index which indicates the intra prediction mode for the current block among the MPM candidates (S710).

On the other hand, when the intra prediction mode for the current block is not included in the MPM candidates, that is, when the intra prediction mode for the current block is one of the remaining intra prediction modes, the encoding apparatus may generate subgroup information indicating a subgroup including an intra prediction mode for the current block (S720). For example, the subgroup information may be an index having any one value of 0 to M−1. That is, the encoding apparatus may generate subgroup information indicating a subgroup for the current block, and the subgroup information may be an index having any one value of 0 to M−1.

Here, for example, the remaining intra prediction modes may be classified into M (M>2) subgroups. Specifically, among the intra prediction modes, the remaining intra prediction modes excluding the MPM candidates may be rearranged in the order of priority indicated in the lookup table, and a first subgroup including $K_1$ intra prediction modes in the rearranged order, a second subgroup including $K_2$ intra prediction modes in the rearranged order, a third subgroup including $K_3$ intra prediction modes in the rearranged order . . . , and an $M^{th}$ subgroup including $K_M$ intra prediction modes in the rearranged order may be set. The encoding apparatus may generate subgroup information indicating a subgroup including an intra prediction mode for the current block.

Meanwhile, the lookup table may be predetermined, or may be a lookup table derived from among a plurality of predetermined lookup tables. The lookup table may indicate a rank of an intra prediction mode. That is, the lookup table may show the ranks of all the intra prediction modes. Here, the rank of the intra prediction mode may indicate the degree of occurrence of the intra prediction mode. Therefore, the intra prediction mode, which is frequently used for prediction in an image, may be appeared as a high rank in the lookup table, and the intra prediction mode, which is not frequently used for prediction in an image, may be appeared as a low rank in the lookup table.

The encoding apparatus may derive a binarization method for the subgroup for the current block (S730), and encode the remaining intra prediction mode information indicating an intra prediction mode for the current block based on the binarization method for the subgroup (S740).

For example, the number of intra prediction modes included in each of the plurality of subgroups may be predetermined. For example, the binarization method for the corresponding subgroup may be set based on the number of intra prediction modes included in the corresponding subgroup. For example, truncated binary (TB) code, fixed length (FL) code, or truncated unary (TU) code may be set as the binarization method for the corresponding subgroup. The encoding apparatus may binarize with a binarization method for the subgroup a value of remaining intra prediction mode information indicating an intra prediction mode for the current block, and may context-based encode or bypass encode the binarized value.

Meanwhile, the decoding apparatus may rearrange the intra prediction modes based on the lookup table, and obtain the intra prediction mode information on the current block, and the intra prediction mode information may include subgroup information and remaining intra prediction mode information. Thereafter, the decoding apparatus may derive the subgroup for the current block based on the subgroup information, and decode the remaining intra prediction mode information for the current block based on the coding method for the subgroup. Among the rearranged intra prediction modes, an intra prediction mode indicated by the decoded intra prediction mode information may be derived as an intra prediction mode for the current block. Specifically, for example, the decoding apparatus may rearrange the intra prediction modes based on the lookup table, and obtain the intra prediction mode information on the current block, and the intra prediction mode information may include subgroup information and remaining intra prediction mode information. Here, the subgroup information may be an index indicating one subgroup among M (M>2) subgroups.

Thereafter, the decoding apparatus may derive the subgroup for the current block based on the subgroup information, and decode the remaining intra prediction mode information for the current block based on the coding method for the subgroup. Among the rearranged intra prediction modes, an intra prediction mode indicated by the decoded intra prediction mode information may be derived as an intra prediction mode for the current block.

Meanwhile, another embodiment may propose a method in which a plurality of lookup tables may be preset, one lookup table among the plurality of lookup tables may be derived to indicate the remaining intra prediction mode information on for the current block, and the remaining intra prediction mode information may be coded based on the derived lookup table.

Figure 8:
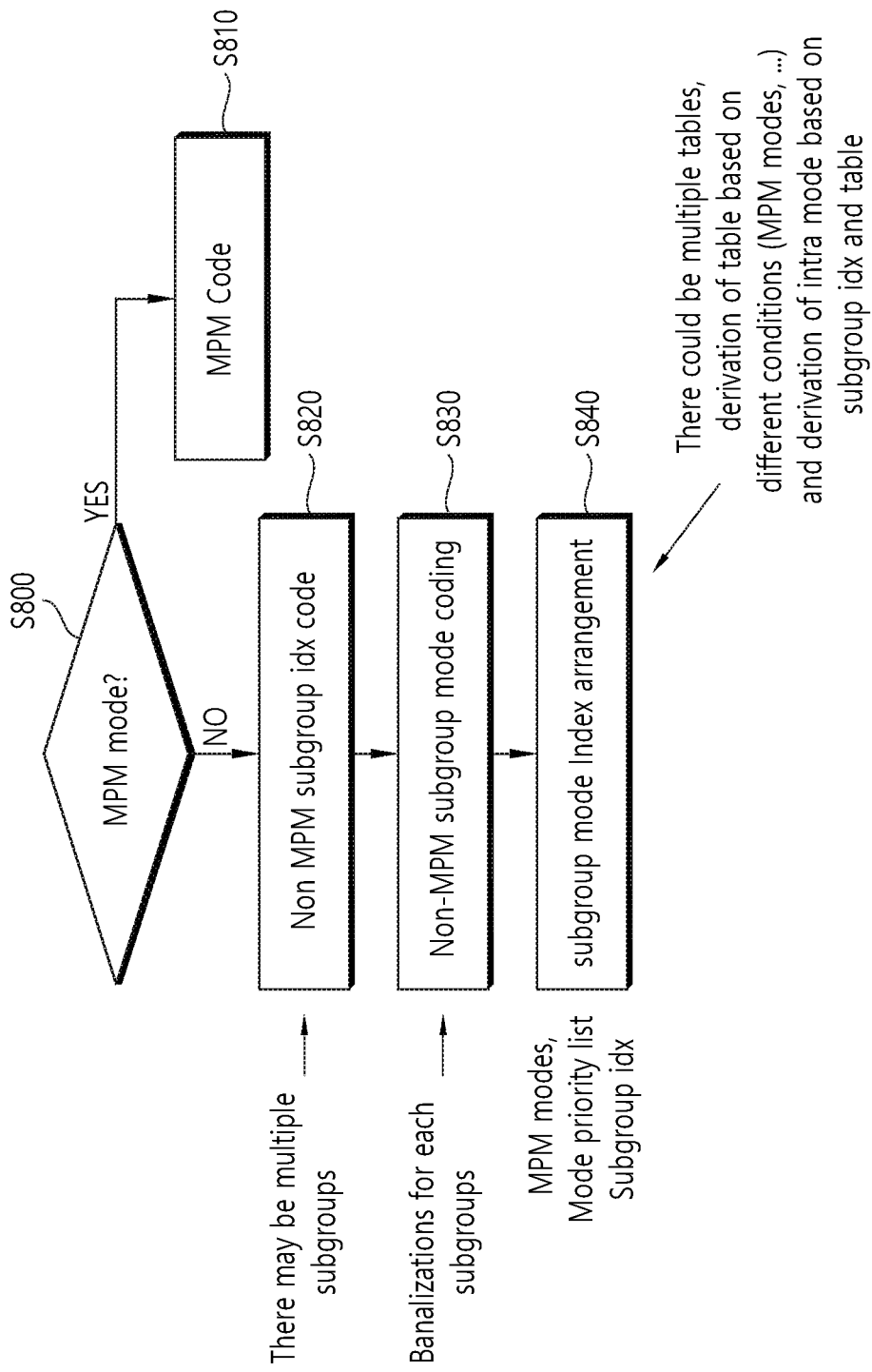
FIG. 8 shows an example of deriving one lookup table from among a plurality of lookup tables and coding information on the remaining intra prediction modes based on the derived lookup table.

FIG. 8 shows an example of deriving one lookup table from among a plurality of lookup tables and coding information on the remaining intra prediction modes based on the derived lookup table.

The encoding apparatus may determine an intra prediction mode for the current block and determine whether or not the intra prediction mode is included in MPM candidates for the current block (S800). The encoding apparatus may construct the MPM list including MPM candidates for the current block. In addition, the encoding apparatus may perform various intra prediction modes to derive an intra prediction mode with an optimal RD cost as the intra prediction mode for the current block. The intra prediction mode may be one of two non-directional intra prediction modes and 65 intra directional prediction modes. As described above, the two non-directional intra prediction modes may include the intra DC mode and the intra planar mode.

In this case, the intra prediction mode for the current block may be one of the MPM candidates, or may be one of the remaining intra prediction modes excluding the MPM candidates.

When the intra prediction mode for the current block is one of the MPM candidates, the encoding apparatus may code intra prediction mode information including an MPM index which indicates the intra prediction mode for the current block among the MPM candidates (S810).

On the other hand, when the intra prediction mode for the current block is not included in the MPM candidates, that is, when the intra prediction mode for the current block is one of the remaining intra prediction modes, the encoding apparatus may generate subgroup information indicating a subgroup including an intra prediction mode for the current block (S820). For example, the subgroup information may be a flag or an index.

For example, the remaining intra prediction modes may be classified into a plurality of subgroups. As described above, among the intra prediction modes, the remaining intra prediction modes excluding the MPM candidates may be rearranged in the order of priority indicated in the lookup table, and the rearranged remaining intra prediction modes may be classified into two subgroups, or may be classified into more than two subgroups.

Meanwhile, the encoding apparatus may derive the lookup table for the current block from a plurality of lookup tables. For example, a plurality of fixed lookup tables may be used to store an intra prediction direction by probability of occurrence under different conditions.

For example, different lookup tables may be stored according to the slice type. That is, the encoding apparatus may derive a lookup table for the current block from among a plurality of lookup tables based on the slice type for the current block.

As another example, different lookup tables may be stored according to the block size. That is, the encoding apparatus may derive a lookup table for the current block from among a plurality of lookup tables based on the size of the current block.

As another example, different lookup tables may be stored according to the MPM list.

That is, the encoding apparatus may derive a lookup table for the current block from among a plurality of lookup tables based on the MPM list for the current block.

As another example, different lookup tables may be stored according to the quantization parameter. That is, the encoding apparatus may derive a lookup table for the current block from among a plurality of lookup tables based on the quantization parameter for the current block.

Also, different lookup tables may be stored according to a combination of the above-described conditions. That is, the encoding apparatus may derive a lookup table for the current block from among a plurality of lookup tables based on the slice type, size, MPM list, and/or quantization parameter for the current block.

The encoding apparatus may derive a binarization method for the subgroup for the current block (S830), and encode the remaining intra prediction mode information indicating an intra prediction mode for the current block based on the binarization method for the subgroup (S840). For example, as described above, the binarization method for the corresponding subgroup may be set based on the number of intra prediction modes included in the corresponding subgroup. For example, truncated binary (TB) code, fixed length (FL) code, or truncated unary (TU) code may be set as the binarization method for the corresponding subgroup. The encoding apparatus may binarize with a binarization method for the subgroup a value of remaining intra prediction mode information indicating an intra prediction mode for the current block, and may context-based encode or bypass encode the binarized value.

Meanwhile, the decoding apparatus may derive a lookup table for the current block from among a plurality of lookup tables, rearrange the intra prediction modes based on the derived lookup table, and obtain the intra prediction mode information on the current block, and the intra prediction mode information may include subgroup information and remaining intra prediction mode information. As an example, the decoding apparatus may derive a lookup table for the current block from among a plurality of lookup tables based on the slice type for the current block. Further, as another example, the decoding apparatus may derive a lookup table for the current block from among a plurality of lookup tables based on the size of the current block. Further, as another example, the decoding apparatus may derive a lookup table for the current block from among a plurality of lookup tables based on the MPM list for the current block. Further, the decoding apparatus may derive a lookup table for the current block from among a plurality of lookup tables based on the quantization parameter for the current block. Further, the encoding apparatus may derive a lookup table for the current block from among a plurality of lookup tables based on the slice type, size, MPM list, and/or quantization parameter for the current block.

Thereafter, the decoding apparatus may derive the subgroup for the current block based on the subgroup information, and decode the remaining intra prediction mode information for the current block based on the coding method for the subgroup. Among the rearranged intra prediction modes, an intra prediction mode indicated by the decoded intra prediction mode information may be derived as an intra prediction mode for the current block.

Specifically, for example, the decoding apparatus may rearrange the intra prediction modes based on the lookup table, and obtain the intra prediction mode information on the current block, and the intra prediction mode information may include subgroup information and remaining intra prediction mode information. Here, the subgroup information may be a flag or an index indicating one subgroup among a plurality of subgroups. Thereafter, the decoding apparatus may derive the subgroup for the current block based on the subgroup information, and decode the remaining intra prediction mode information for the current block based on the coding method for the subgroup. Among the rearranged intra prediction modes, an intra prediction mode indicated by the decoded intra prediction mode information may be derived as an intra prediction mode for the current block.

Meanwhile, though the lookup table may be predetermined as described above, the lookup table may be signaled through a bitstream. For example, the encoding apparatus may derive and signal a lookup table for the current block. The decoding apparatus may obtain a lookup table for the current block through a bitstream, and derive an intra prediction mode for the current block based on the lookup table from intra prediction mode information such as subgroup, subgroup information, and MPM flag of the remaining intra prediction modes. Further, as an example, the lookup table may be signaled for each slice, a group of pictures, or each sequence. For example, the lookup table may be signaled in a slice unit, a picture parameter set (PPS) unit, or a sequence parameter set (SPS) unit.

In addition, for example, a plurality of predetermined lookup tables may be signaled through a bitstream. In this case, an index indicating a lookup table for the current block among the plurality of lookup tables may be additionally signaled. Alternatively, a lookup table for the current block may be derived from among the plurality of predetermined lookup tables based on a block type of the current block, a type of a slice including the current block, and/or a neighboring block of the current block and the like.

Furthermore, for example, the encoding apparatus and the decoding apparatus may start coding by using an initial look-up table as a look-up table for coding remaining intra prediction mode information, and may adaptively update the lookup table from the initial lookup table. The decoding apparatus may adaptively update the lookup table from the initial lookup table based on an additionally signaled lookup table indicator. Meanwhile, the initial lookup table may be predetermined, or may be signaled through a bitstream.

Figure 9:
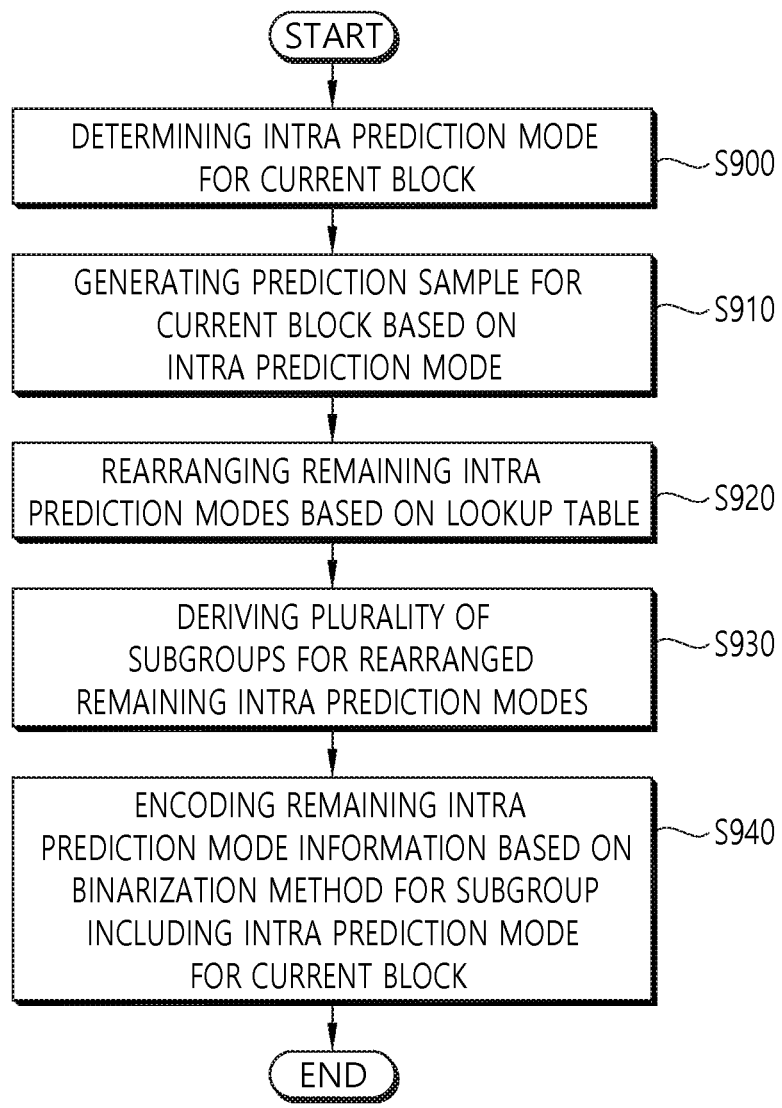
FIG. 9 schematically represents an image encoding method by an encoding apparatus according to the present disclosure.

FIG. 9 schematically represents an image encoding method by an encoding apparatus according to the present disclosure. The method disclosed in FIG. 9 may be performed by the encoding apparatus disclosed in FIG. 1. Specifically, for example, S900 to S910 of FIG. 9 may be performed by the predictor of the encoding apparatus, and S920 to S940 may be performed by the entropy encoder of the encoding apparatus. Further, although not shown, the process of deriving the residual sample for the current block based on the prediction sample and the original sample for the current block may be performed by the subtractor of the encoding apparatus, the process of generating information on residual for the current block based on the residual sample may be performed by the transformer of the encoding apparatus, and the process of encoding the information on residual may be performed by the entropy encoder of the encoding apparatus.

The encoding apparatus determines an intra prediction mode for the current block (S900). The encoding apparatus may perform various intra prediction modes to derive an intra prediction mode with an optimal RD cost as the intra prediction mode for the current block. The intra prediction mode may be one of two non-directional intra prediction modes and 65 intra directional prediction modes. As described above, the two non-directional intra prediction modes may include the intra DC mode and the intra planar mode.

The encoding apparatus generates a prediction sample for the current block based on the intra prediction mode (S910). The encoding apparatus may derive at least one neighboring sample from among neighboring samples of the current block based on the intra prediction mode, and generate the prediction sample based on the neighboring samples. The neighboring samples may include a top-left corner neighboring sample, top neighboring samples and left neighboring samples of the current block. For example, when a size of the current block is W×H, and an x component of a top-left sample position of the current block is 0 and a y component thereof is 0, then the left neighboring samples may be p[4][0] to p[−1][2H−1], the top-left corner neighboring sample may be [−1][−1], and the top neighboring samples may be p[0][−1] to p[2 W−1][−1].

The encoding apparatus rearranges the remaining intra prediction modes based on the lookup table (S920). The encoding apparatus may construct the MPM list including MPM candidates for the current block, and rearrange the remaining intra prediction modes excluding the MPM candidates among intra prediction modes in order of priority shown in the lookup table. The lookup table may indicate priorities of the intra prediction modes. The priority may indicate a degree of occurrence of an intra prediction mode for the priority. An intra prediction mode having a high probability of occurrence (i.e., use probability) in an image may appear as a high rank in the lookup table, and an intra prediction mode having a low probability of occurrence in an image may appear as a low rank in the lookup table.

Here, for example, the lookup table may be predetermined. Alternatively, for example, the encoding apparatus may derive the lookup table and encode information on the lookup table. The encoding apparatus may signal information on the lookup table through a bitstream. The information on the lookup table may be signaled in a slice unit, a PPS unit, or an SPS unit.

In addition, as another example, the encoding apparatus may derive one of a plurality of lookup tables as the lookup table. In this case, the encoding apparatus may encode an index indicating one of the plurality of lookup tables, and may signal the index through a bitstream. The index may be signaled in a slice unit, a PPS unit, or a SPS unit.

Alternatively, the encoding apparatus may derive the lookup table from among the plurality of lookup tables based on the type of the current block, the size of the current block, the type of the slice including the current block, and/or the neighboring block of the current block. Here, the type of the current block may be a non-square (rectangular) block or a square block, and the type of the slice may be an I slice, a P slice, or a B slice. Meanwhile, the plurality of lookup tables may be predetermined. Alternatively, the encoding apparatus may derive the plurality of lookup tables and may encode information on the plurality of lookup tables. The encoding apparatus may signal information on the plurality of lookup tables through a bitstream. The information on the plurality of lookup tables may be signaled in a slice unit, a PPS unit, or an SPS unit.

Meanwhile, the encoding apparatus may construct a most probable mode (MPM) list of the current block based on a neighboring block of the current block. Here, as an example, the MPM list may include 3 MPM candidates, 5 MPM candidates, or 6 MPM candidates.

For example, the encoding apparatus may construct the MPM list of the current block based on the neighboring block of the current block, and the MPM list may include 6 MPM candidates. The neighboring block(s) may include the left neighboring block, the top neighboring block, the bottom-left neighboring block, the top-right neighboring block and/or the top-left neighboring block of the current block. The encoding apparatus may search neighboring blocks of the current block in a specific order, and may derive the intra prediction mode of the neighboring block as the MPM candidate in the derived order. For example, the encoding apparatus may search for an intra prediction mode of the left neighboring block, an intra prediction mode, planar intra prediction mode, DC intra prediction mode of the top neighboring block, an intra prediction mode of the bottom-left neighboring block, an intra prediction mode of the top-right neighboring block, and an intra prediction mode of the top-left neighboring block in this order, may derive an MPM candidate, and may construct an MPM list of the current block. Meanwhile, if six MPM candidates are not derived after the search, an MPM candidate may be derived based on an intra prediction mode derived as an MPM candidate. For example, when the intra prediction mode derived as the MPM candidate is a No. N intra prediction mode, the encoding apparatus may derive the No. N+1 intra prediction mode and/or No. N−1 intra prediction mode as the MPM candidate of the current block.

The encoding apparatus derives a plurality of subgroups for the rearranged remaining intra prediction modes (S930). For example, the encoding apparatus may derive two subgroups for the rearranged remaining intra prediction modes. The subgroups may include subgroup 1 and subgroup 2, the subgroup 1 may include $K_1$ intra prediction modes leading in the rearranged order, and the subgroup 2 may include $K_2$ intra prediction modes following the intra prediction modes included in the subgroup 1 in the rearranged order. Here, the number of intra prediction modes included in the subgroup may be predetermined. That is, the $K_1$ and $K_2$ may be predetermined.

Further, for example, the encoding apparatus may derive M (M>2) subgroups for the rearranged remaining intra prediction modes. The number of intra prediction modes included in each of the M subgroups may be predetermined. The subgroups may include the predetermined number of intra prediction modes for each subgroup in the rearranged order.

The encoding apparatus encodes the remaining intra prediction mode information based on a binarization method for a subgroup including the intra prediction mode for the current block (S940). The binarization method may be set for each of the plurality of subgroups. The binarization method may be a truncated binary (TB) code, a fixed length (FL) code, or a truncated unary (TU) code. For example, the binarization method for the subgroup 1 may be the TB code, and the binarization method for the subgroup 2 may be the FL code. In addition, the binarization method for the corresponding subgroup may be set based on the number of intra prediction modes included in the corresponding subgroup. The encoding apparatus may encode the remaining intra prediction mode information based on the binarization method for the subgroup including the intra prediction mode for the current block. The remaining intra prediction mode information may indicate an intra prediction mode for the current block among intra prediction modes included in the subgroup. The remaining intra prediction mode information may indicate a rearranged index value of the intra prediction mode for the current block. The intra prediction mode information for the current block may include the remaining intra prediction mode information.

Meanwhile, the encoding apparatus may encode subgroup information indicating a subgroup for the current block. That is, subgroup information indicating the subgroup including the intra prediction mode for the current block may be encoded, and the subgroup information may be signaled through the bitstream. The intra prediction mode information for the current block may include the subgroup information.

Meanwhile, the encoding apparatus may generate an MPM flag indicating whether the determined intra prediction mode is included in MPM candidates of the MPM list. The intra prediction mode information may include the MPM flag. When the determined intra prediction mode is included in the MPM candidates of the MPM list, the intra prediction mode information indicating the determined intra prediction mode among the MPM candidates may be encoded. On the other hand, when the determined intra prediction mode is not included in the MPM candidates of the MPM list, the remaining intra prediction mode information indicating the determined intra prediction mode among the remaining intra prediction modes not included in the MPM candidates may be generated. On the other hand, when the determined intra prediction mode is included in the MPM candidates of the MPM list, the encoding apparatus may not signal the MPM flag, and the value of the MPM flag may be derived as 1.

Meanwhile, the bitstream may be transmitted to the decoding apparatus through a network or a (digital) storage medium. Here, the network may include a broadcast network, a communication network and/or the like, and the digital storage medium may include various storage media such as USB, SD, CD, DVD, Blu-ray, HDD, SSD, and the like.

Figure 10:
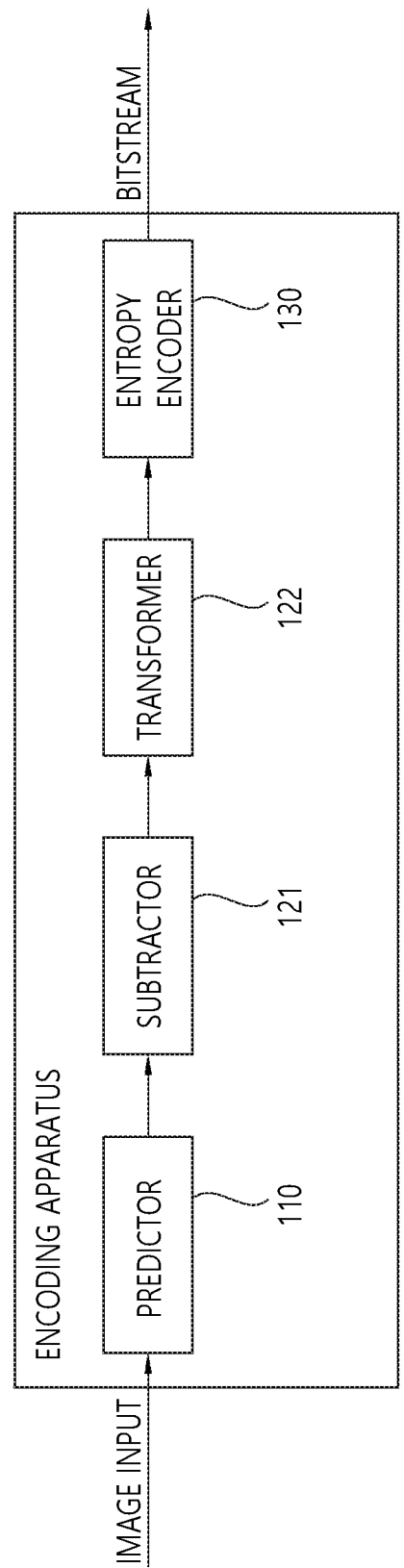
FIG. 10 schematically represents an encoding apparatus performing an image encoding method according to the present disclosure.

FIG. 10 schematically represents an encoding apparatus performing an image encoding method according to the present disclosure. The method disclosed in FIG. 9 may be performed by the encoding apparatus disclosed in FIG. 10. Specifically, for example, the predictor of the encoding apparatus of FIG. 10 may perform S900 to S910 of FIG. 9, and the entropy encoder of the encoding apparatus of FIG. 10 may perform S920 to S940 of FIG. 9. Further, although not shown, the process of deriving the residual sample for the current block based on the prediction sample and the original sample for the current block may be performed by the subtractor of the encoding apparatus of FIG. 10, the process of generating information on residual for the current block based on the residual sample may be performed by the transformer of the encoding apparatus of FIG. 10, and the process of encoding the information on residual may be performed by the entropy encoder of the encoding apparatus of FIG. 10.

Figure 11:
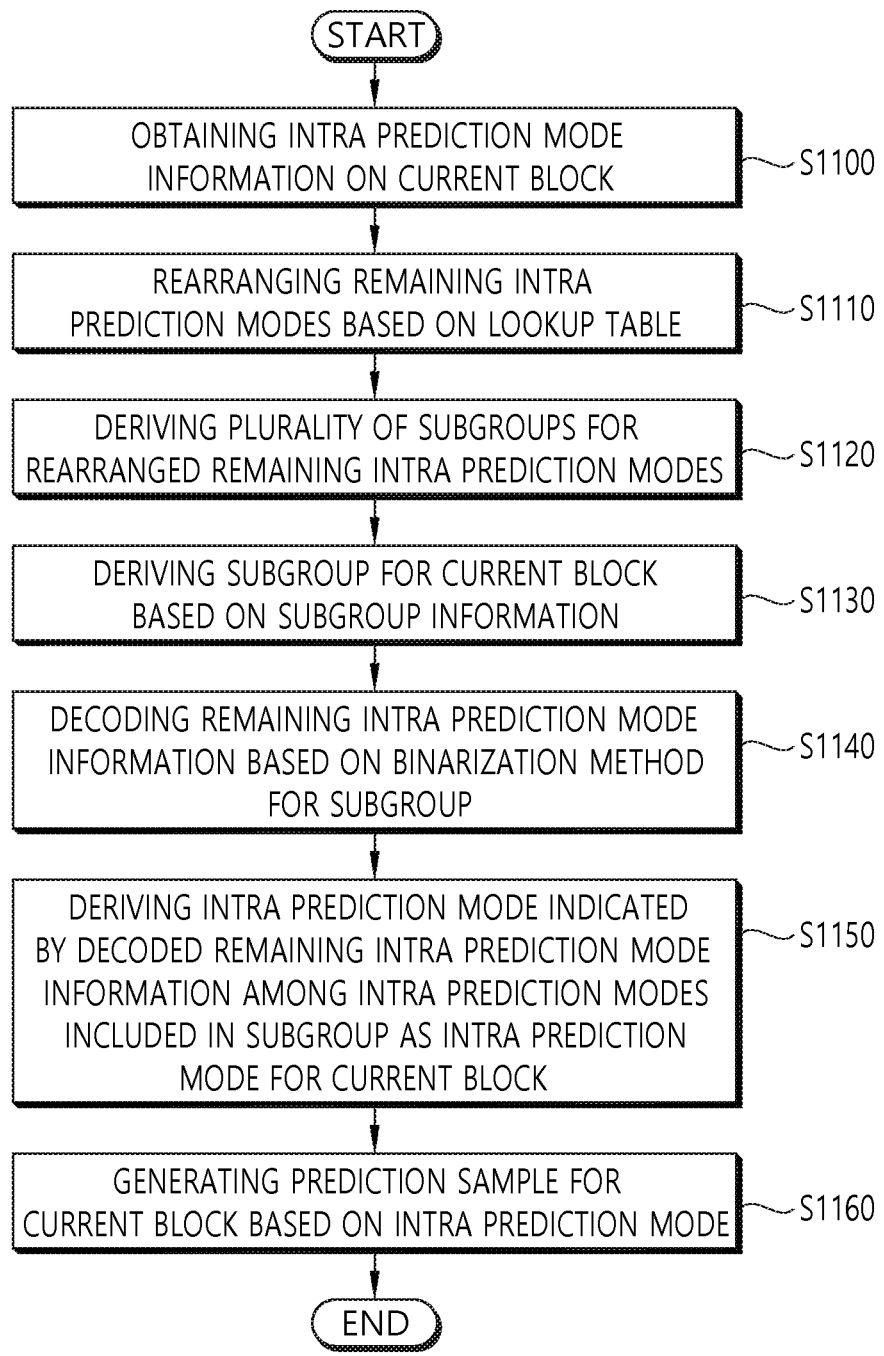
FIG. 11 schematically represents an image decoding method by a decoding apparatus according to the present disclosure.

FIG. 11 schematically represents an image decoding method by a decoding apparatus according to the present disclosure. The method disclosed in FIG. 11 may be performed by the decoding apparatus disclosed in FIG. 2. Specifically, for example, S1100 to S1140 of FIG. 11 may be performed by the entropy decoder of the decoding apparatus, and S1150 to S1160 may be performed by the predictor of the decoding apparatus. Further, although not shown, the process of obtaining information on residual for the current block through a bitstream may be performed by the entropy decoder of the decoding apparatus, the process of deriving the residual sample for the current block based on the residual information may be performed by the inverse transformer of the decoding apparatus, and the process of generating a reconstructed picture based on the prediction sample and the residual sample may be performed by the adder of the decoding apparatus.

The decoding apparatus obtains intra prediction mode information for the current block (S1100). For example, the intra prediction mode information may include subgroup information and remaining intra prediction mode information. The decoding apparatus may obtain intra prediction mode information for the current block from the bitstream. The remaining intra prediction mode information may indicate one of the rearranged remaining intra prediction modes. The remaining intra prediction modes may represent remaining intra prediction modes not included in the MPM candidates of the MPM list. The remaining intra prediction mode information may be signaled in the form of a rem_intra_lumapred_mode or intra_luma_mpm_remainder syntax element. A specific process of rearranging the remaining intra prediction modes will be described as below.

In addition, for example, the decoding apparatus may derive an MPM flag for the current block, and when the value of the MPM flag is 1, the decoding apparatus may obtain the intra prediction mode information for the current block from the bitstream, and the intra prediction mode information may include an MPM index indicating one of MPM candidates included in the MPM list for the current block. Here, the intra prediction mode information may include an MPM flag for the current block. Alternatively, the intra prediction mode information may not include the MPM flag, and in this case, the decoding apparatus may derive the value of the MPM flag as 1.

In addition, when the value of the MPM flag is 0, the decoding apparatus may obtain intra prediction mode information for the current block from the bitstream, and the intra prediction mode information may include the remaining intra prediction mode information.

The decoding apparatus rearranges the remaining intra prediction modes based on the lookup table (S1110). The decoding apparatus may construct the MPM list including MPM candidates for the current block, and rearrange the remaining intra prediction modes excluding the MPM candidates among intra prediction modes in the order of priority shown in the lookup table. The lookup table may indicate priorities of the intra prediction modes. The priority may indicate a degree of occurrence of an intra prediction mode for the priority. An intra prediction mode having a high probability of occurrence (i.e., use probability) in an image may appear as a high rank in the lookup table, and an intra prediction mode having a low probability of occurrence in an image may appear as a low rank in the lookup table.

Here, for example, the lookup table may be predetermined. Alternatively, for example, the decoding apparatus may obtain information on the lookup table through a bitstream, and derive the lookup table based on the information on the lookup table. The information on the lookup table may be signaled in a slice unit, a PPS unit, or an SPS unit.

In addition, as another example, the decoding apparatus may derive one of a plurality of lookup tables as the lookup table. For example, the decoding apparatus may obtain an index indicating one of the plurality of lookup tables, and derive the lookup table based on the index. Alternatively, the decoding apparatus may derive the lookup table from among the plurality of lookup tables based on the type of the current block, the size of the current block, the type of the slice including the current block, and/or the neighboring block of the current block. Here, the type of the current block may be a non-square (rectangular) block or a square block, and the type of the slice may be an I slice, a P slice, or a B slice. Meanwhile, the plurality of lookup tables may be predetermined. Alternatively, the decoding apparatus may obtain information on the plurality of lookup tables through a bitstream, and derive the plurality of lookup tables based on information on the plurality of lookup tables.

Meanwhile, the decoding apparatus may construct a most probable mode (MPM) list of the current block based on a neighboring block of the current block. Here, as an example, the MPM list may include 3 MPM candidates, 5 MPM candidates, or 6 MPM candidates. For example, the decoding apparatus may construct the MPM list of the current block based on the neighboring block of the current block, and the MPM list may include 6 MPM candidates. The neighboring block(s) may include the left neighboring block, the top neighboring block, the bottom-left neighboring block, the top-right neighboring block and/or the top-left neighboring block of the current block. The decoding apparatus may search neighboring blocks of the current block in a specific order, and may derive the intra prediction mode of the neighboring block as the MPM candidate in the derived order. For example, the decoding apparatus may search for an intra prediction mode of the left neighboring block, an intra prediction mode, planar intra prediction mode, DC intra prediction mode of the top neighboring block, an intra prediction mode of the bottom-left neighboring block, an intra prediction mode of the top-right neighboring block, and an intra prediction mode of the top-left neighboring block in this order, may derive an MPM candidate, and may construct an MPM list of the current block. Meanwhile, if six MPM candidates are not derived after the search, an MPM candidate may be derived based on an intra prediction mode derived as an MPM candidate. For example, when the intra prediction mode derived as the MPM candidate is a No. N intra prediction mode, the decoding apparatus may derive the No. N+1 intra prediction mode and/or No. N−1 intra prediction mode as the MPM candidate of the current block.

The decoding apparatus derives a plurality of subgroups for the rearranged remaining intra prediction modes (S1120).

For example, the decoding apparatus may derive two subgroups for the rearranged remaining intra prediction modes. The subgroups may include subgroup 1 and subgroup 2, the subgroup 1 may include $K_1$ intra prediction modes leading in the rearranged order, and the subgroup 2 may include $K_2$ intra prediction modes following the intra prediction modes included in the subgroup 1 in the rearranged order. Here, the number of intra prediction modes included in the subgroup may be predetermined. That is, the $K_1$ and $K_2$ may be predetermined.

Further, for example, the decoding apparatus may derive M (M>2) subgroups for the rearranged remaining intra prediction modes. The number of intra prediction modes included in each of the M subgroups may be predetermined. The subgroups may include the predetermined number of intra prediction modes for each subgroup in the rearranged order.

The decoding apparatus derives a subgroup for the current block based on the subgroup information (S1130). The decoding apparatus may derive a subgroup indicated by the subgroup information from among a plurality of subgroups as a subgroup for the current block. Here, when the number of the plurality of subgroups is 2, the subgroup information may be a flag, and when the number of the plurality of subgroups is greater than two, the subgroup information may be an index.

The decoding apparatus decodes the remaining intra prediction mode information based on a binarization method for the subgroup (S1140). The binarization method may be set for each of the plurality of subgroups. The binarization method may be a truncated binary (TB) code, a fixed length (FL) code, or a truncated unary (TU) code. For example, the binarization method for the subgroup 1 may be the TB code, and the binarization method for the subgroup 2 may be the FL code. In addition, the binarization method for the corresponding subgroup may be set based on the number of intra prediction modes included in the corresponding subgroup. The decoding apparatus may decode the remaining intra prediction mode information based on a binarization method for the subgroup.

The decoding apparatus derives an intra prediction mode indicated by the decoded remaining intra prediction mode information among intra prediction modes included in the subgroup as an intra prediction mode for the current block (S1150). The decoding apparatus may derive an intra prediction mode indicated by the decoded remaining intra prediction mode information among intra prediction modes included in the subgroup as the intra prediction mode for the current block. The decoded remaining intra prediction mode information may indicate a rearranged index value of the intra prediction mode.

The decoding apparatus generates a prediction sample for the current block based on the intra prediction mode (S1160). The decoding apparatus may derive at least one neighboring sample from among neighboring samples of the current block based on the intra prediction mode, and generate the prediction sample based on the neighboring samples. The neighboring samples may include a top-left corner neighboring sample, top neighboring samples and left neighboring samples of the current block. For example, when a size of the current block is W×H, and an x component of a top-left sample position of the current block is 0 and a y component thereof is 0, then the left neighboring samples may be p[4][0] to p[−1][2H−1], the top-left corner neighboring sample may be [−1][−1], and the top neighboring samples may be p[0][−1] to p[2 W−1][−1].

Meanwhile, though not shown in the drawings, the decoding apparatus may use the prediction sample directly as a reconstruction sample according to the prediction mode, or generate a reconstruction sample by adding a residual sample to the prediction sample. If there is a residual sample for the current block, the decoding apparatus may receive information on the residual for the current block, and the information on the residual may be included in the information on the pace. The information on residual may include a transform coefficient relating to the residual sample. The decoding apparatus may derive the residual sample (or residual sample array) for the current block based on the residual information. The decoding apparatus may generate the reconstruction sample based on the prediction sample and the residual sample, and derive a reconstructed block or reconstructed picture based on the reconstruction sample. After this, as described above, the decoding apparatus may apply an in-loop filtering procedure such as an SAO procedure and/or deblocking filtering to the reconstructed picture in order to improve subjective/objective video quality, as needed.

Figure 12:
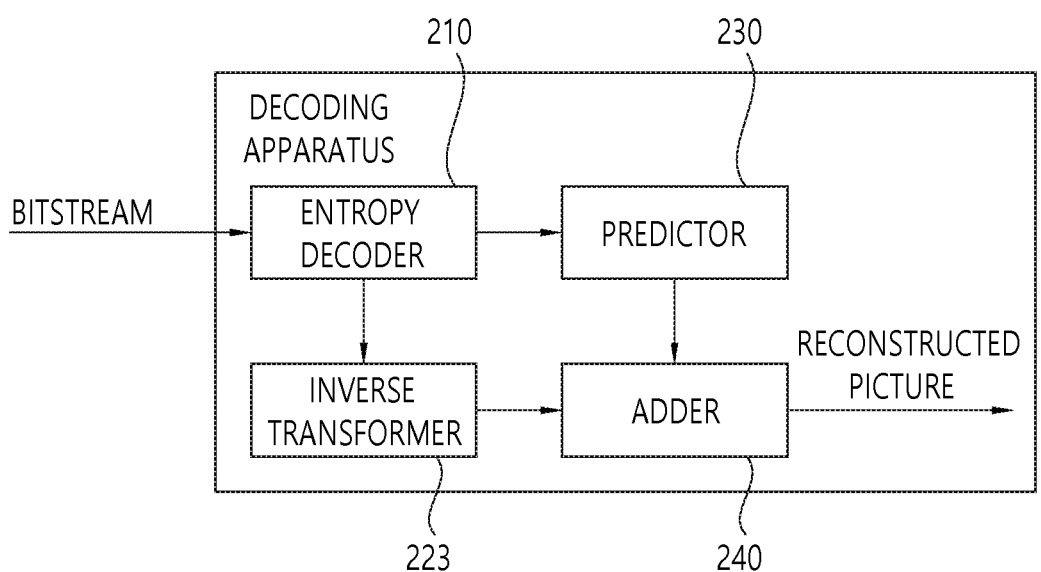
FIG. 12 schematically represents a decoding apparatus performing an image decoding method according to the present disclosure.

FIG. 12 schematically represents a decoding apparatus performing an image decoding method according to the present disclosure. The method disclosed in FIG. 11 may be performed by the decoding apparatus disclosed in FIG. 12. Specifically, for example, the entropy decoder of the decoding apparatus of FIG. 12 may perform S1100 to S1140 of FIG. 11, and the predictor of the decoding apparatus of FIG. 12 may perform S1150 to S1160 of FIG. 11. Further, although not shown, the process of obtaining information on residual for the current block through a bitstream may be performed by the entropy decoder of the decoding apparatus of FIG. 12, the process of deriving the residual sample for the current block based on the residual information may be performed by the inverse transformer of the decoding apparatus of FIG. 12, and the process of generating a reconstructed picture based on the prediction sample and the residual sample may be performed by the adder of the decoding apparatus of FIG. 12.

According to the present disclosure described above, the intra prediction modes may be rearranged in the order of high probability of occurrence based on the lookup table, and an amount of bits for indicating an intra prediction mode of the current block may be reduced by coding intra prediction mode information indicating a rearranged index value, so that overall coding efficiency may be improved.

In addition, according to the present disclosure, the remaining intra prediction modes excluding MPM candidates are rearranged, the intra prediction mode information may be coded by classifying the rearranged intra prediction modes into a plurality of subgroups and changing the binarization method according to the subgroup including the intra prediction mode of the current block, and through this, the amount of bits for indicating the intra prediction mode of the current block can be reduced and the overall coding efficiency can be improved.

In the above-described embodiments, the methods are explained based on flowcharts by means of a series of steps or blocks, but the present disclosure is not limited to the order of steps, and a certain step may occur in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding device and/or decoding device according to the disclosure may be included in a device for image processing, such as, a TV, a computer, a smartphone, a set-top box, a display device or the like.

When embodiments in the present disclosure are embodied by a software, the above-described methods may be embodied as modules (processes, functions or the like) to perform the above-described functions. The modules may be stored in a memory and may be executed by a processor. The memory may be inside or outside the processor and may be connected to the processor via a well-known various means. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding device and the encoding device to which the present disclosure is applied may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment based on a user's request through the web server, which functions as an instrument that informs a user of what service there is. When the user requests a service which he or she wants, the web server transfers it to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

What is claimed is:

1. An image decoding method performed by a decoding apparatus, the method comprising:
    obtaining intra prediction mode information on a current block, wherein the intra prediction mode information includes subgroup information and remaining intra prediction mode information;
    rearranging remaining intra prediction modes based on a lookup table;
    deriving a plurality of subgroups for the rearranged remaining intra prediction modes;
    deriving a subgroup for the current block based on the subgroup information;
    decoding the remaining intra prediction mode information based on a binarization method for the subgroup;
    deriving an intra prediction mode indicated by the decoded remaining intra prediction mode information among intra prediction modes included in the subgroup as an intra prediction mode for the current block; and
    generating a prediction sample for the current block based on the intra prediction mode,
    wherein rearranging of the remaining intra prediction modes based on the lookup table includes:
        obtaining an index indicating one of a plurality of lookup tables, and
        deriving the lookup table based on the index.

2. The image decoding method of claim 1, wherein the rearranging of the remaining intra prediction modes based on the lookup table includes:
    constructing a most probable mode (MPM) list including MPM candidates for the current block; and
    rearranging the remaining intra prediction modes excluding the MPM candidates from among intra prediction modes in priority order indicated in the lookup table.

3. The image decoding method of claim 1, wherein the plurality of lookup tables are predetermined.

4. The image decoding method of claim 1, wherein:
    the subgroups include subgroup 1 and subgroup 2;
    the subgroup 1 includes K1 intra prediction modes preceding in a rearranged order; and
    the subgroup 2 includes K2 intra prediction modes following the intra prediction modes included in the subgroup 1 in a rearranged order.

5. The image decoding method of claim 1, wherein:
    a binarization method for the subgroup 1 is a truncated binary (TB) code; and a binarization method for the subgroup 2 is a fixed length (FL) code.

6. An image encoding method performed by an encoding apparatus, the method comprising:
determining an intra prediction mode for a current block;
generating a prediction sample for the current block based on the intra prediction mode;
rearranging remaining intra prediction modes based on a lookup table;
deriving a plurality of subgroups for the rearranged remaining intra prediction modes; and
encoding remaining intra prediction mode information based on a binarization method for a subgroup including the intra prediction mode for the current block,
wherein rearranging of the remaining intra prediction modes based on the lookup table includes:
deriving one of a plurality of lookup tables as the lookup table, and
generating an index indicating the derived lookup table among the plurality of lookup tables.

7. The image encoding method of claim 6, wherein the rearranging of the remaining intra prediction modes based on the lookup table includes:
constructing a most probable mode (MPM) list including MPM candidates for the current block; and
rearranging the remaining intra prediction modes excluding the MPM candidates from among intra prediction modes in priority order indicated in the lookup table.

8. The image encoding method of claim 6, further comprising encoding subgroup information indicating the subgroup for the current block.

9. The image encoding method of claim 6, wherein the plurality of lookup tables are predetermined.

10. The image encoding method of claim 6, wherein:
the subgroups include subgroup 1 and subgroup 2;
a binarization method for the subgroup 1 is a truncated binary (TB) code; and
a binarization method for the subgroup 2 is a fixed length (FL) code.

11. A non-transitory computer-readable storage medium storing a bitstream generated by a method, the method comprising:
determining an intra prediction mode for a current block;
generating a prediction sample for the current block based on the intra prediction mode;
rearranging remaining intra prediction modes based on a lookup table;
deriving a plurality of subgroups for the rearranged remaining intra prediction modes; and
encoding remaining intra prediction mode information based on a binarization method for a subgroup including the intra prediction mode for the current block; and
generating the bitstream including the remaining intra prediction mode information,
wherein rearranging of the remaining intra prediction modes based on the lookup table includes:
deriving one of a plurality of lookup tables as the lookup table, and
generating an index indicating the derived lookup table among the plurality of lookup tables.

* * * * *